Patented Nov. 16, 1937

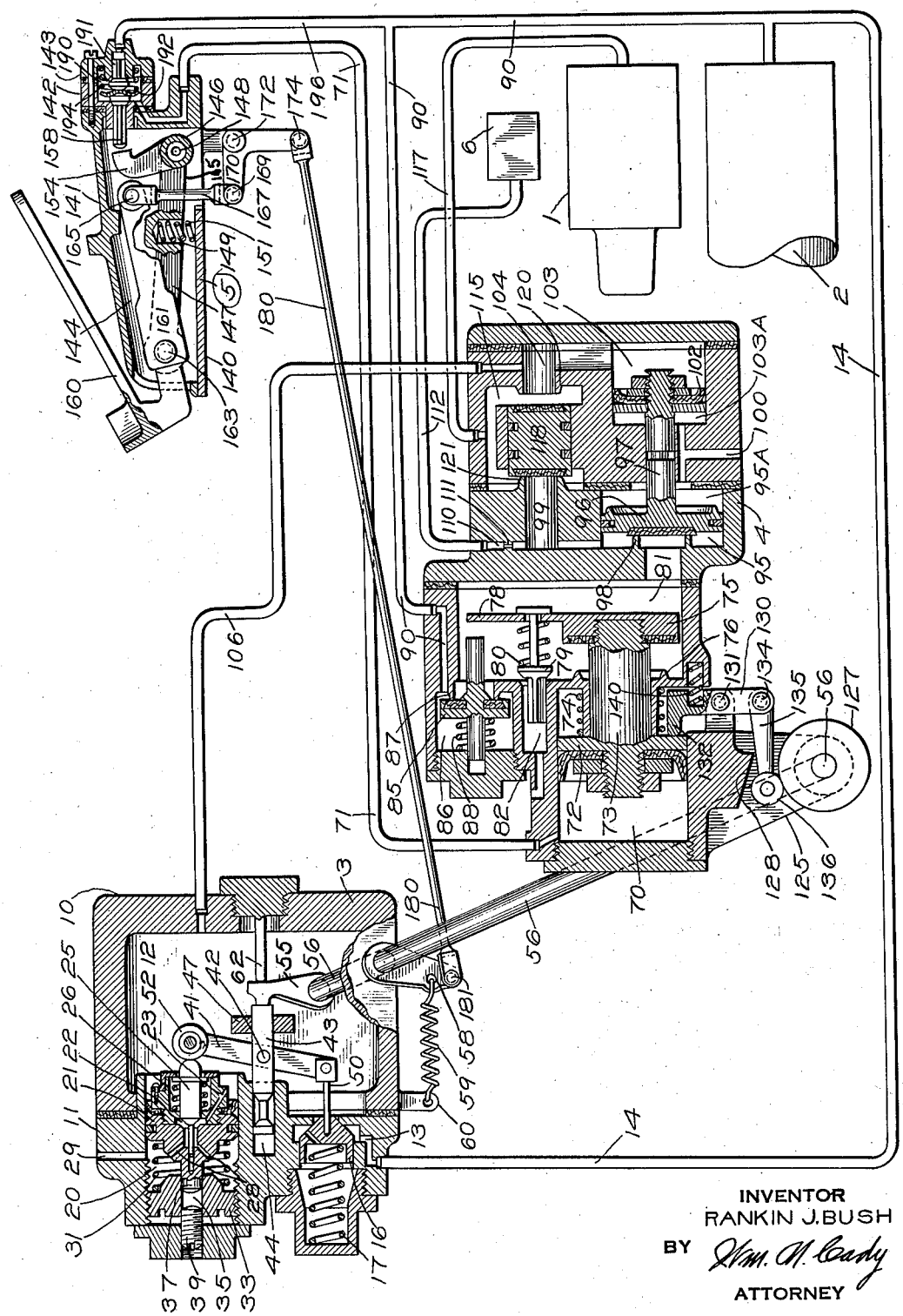

2,099,384

UNITED STATES PATENT OFFICE 2,099,384

FLUID PRESSURE BRAKE

Rankin J. Bush, Jeannette, Pa., assignor to The Westinghouse Air Brake Company, Wilmerding, Pa., a corporation of Pennsylvania Application May 29, 1935, Serial No. 24,037

12 Claims. (Cl. 303—19)

This invention relates to fluid pressure brakes and particularly to control apparatus for controlling fluid pressure brakes adapted for use on railway vehicles.

One type of fluid pressure brake equipment now in use includes a self-lapping brake valve device for controlling the supply of fluid under pressure to and the release of fluid under pressure from the brake cylinder to effect the application and release of the brakes and safety control apparatus for effecting an emergency application of the brakes when the operator's foot is removed from a pedal so that in the event of incapacitation of the operator, such as sudden illness or death, the consequent release of pressure on the foot pedal will cause what is commonly known as "dead man's emergency" application of the brakes.

In certain systems now in use, on an emergency application of the brakes, fluid is supplied to the brake cylinder through the self-lapping brake valve devices employed in these systems, and the rate of flow of fluid to the brake cylinder has been limited by the capacity of the ports in the self-lapping brake valve devices, with the result that the rate of brake application on an emergency application of the brakes is not as rapid as is desired.

It is the principal object of this invention to provide a brake system incorporating safety control apparatus which, when effecting an emergency application of the brakes, operates to supply fluid under pressure to the brake cylinder at a faster rate than that permitted by the self-lapping brake valve device.

A further object of the invention is to provide a brake system incorporating safety control apparatus which, in effecting an emergency application of the brakes, operates to supply fluid under pressure to the brake cylinder through a passage independent of the self-lapping brake valve device, whereby on an emergency application of the brakes the rate of flow of fluid to the brake cylinder is independent of the capacity of the ports through the self-lapping brake valve device.

A further object of the invention is to provide a brake system incorporating safety control apparatus, which in effecting an emergency application of the brakes operates to supply fluid under pressure to the brake cylinder through a passage independent of the self-lapping brake valve device, whereby on an emergency application of the brakes the supply of fluid to the brake cylinder is not dependent on the proper functioning of the self-lapping brake valve device.

Another object of the invention is to provide a brake system incorporating safety control apparatus which is responsive to variations in the pressure of the fluid in the safety control pipe, and which is rendered inoperative in the event that a predetetermined application of the brakes has previously been effected.

A further object of the invention is to provide a brake system incorporating safety control apparatus which is responsive to variations in the pressure of the fluid in a safety control pipe, and which is operative, on an application of the brakes produced by a release of fluid from the safety control pipe, to prevent the release of the brakes until the pressure of the fluid in the safety control pipe is reestablished.

Other objects of the invention and features of novelty will be apparent from the following description taken in connection with the accompanying drawing, the single figure of which is a diagrammatic view of a brake system embodying my invention.

Referring to the drawing the embodiment of the invention therein illustrated comprises a brake cylinder 1, a reservoir 2, the supply of fluid from said reservoir to and the release of fluid from the brake cylinder 1 being controlled by a brake valve device 3, which may be of the self-lapping type, and by a fluid pressure responsive valve device 4, the operation of the brake valve device 3 and the fluid pressure responsive valve device 4 being controlled by a manual brake control device 5. The system also includes an automatic rail sanding device indicated at 6.

The brake valve device 3, which is of the self-lapping type, comprises a main casing section 10 and a valve section 11, which when assembled together define a pressure chamber 12.

The valve section 11 is provided with a valve chamber 13, which is in constant communication with the reservoir 2 by way of a pipe 14, and which contains a supply valve element 16, which is urged to its seat by a coil spring 17, and which controls communication between the valve chamber 13 and the pressure chamber 12.

The valve section 11 also is provided with a piston chamber 20, in which is mounted a piston 21, which is provided with a valve chamber 22, which is in communication with the pressure chamber 12 by way of a passage 23. The valve chamber 22 has positioned therein a release valve element 25, which is biased to the un-seated position by the coil spring 26, and when the valve element 25 is in its un-seated position the valve chamber 22 is in communication with the atmosphere by way of the passage 28, the piston chamber 20, and the passage 29, and when the release valve is in its seated position this communication is cut off.

The piston 21 is subject on one side to the pressure of the fluid in the pressure chamber 12, and on the other side to the pressure of the coil spring 31 which extends between the piston 21 and an abutment 33.

The abutment 33 is provided with a central bore 35 adapted to receive a reduced extension 37 of the piston 21, while a regulating screw 39 is adapted to extend into the bore 35 to limit the amount of movement of the piston 21 to the left as viewed in the drawing.

For actuating the supply valve element 16 to its unseated position, and the release valve 25 to the seated position, there is provided a mechanism including a lever 41, which is secured intermediate its ends by the pin 42 to a floating pivot carrier 43, which is slidably mounted in a bore 44, in the valve section 11, and in a guiding lug 47 formed integral with the main casing section 10.

A stem 50 is pivotally secured to the lower end of the lever 41 and extends into a bore in the end of the supply valve element 16, while a roller 52 is pivotally mounted on the other end of the lever 41 and is adapted to engage the rounded end of the release valve element 25.

The springs 17, 26, and 31 are of different values, the spring 17 being of greater resistance than the spring 26, and being of less resistance than the spring 31.

When the floating pivot carrier 43 is moved to the left as viewed in the drawing, the lever 41 will pivot on the pin 42, and the release valve element 25 will be moved to the left against the pressure of the spring 26 so as to close the passages controlled thereby. On engagement of the release valve element 25 with its seat, and on further movement of the floating pivot carrier 43 to the left, the lever 41 will pivot on the axis formed by the roller 52, and the supply valve element 16 will be moved to the left to open the passage leading from the reservoir 2 to the pressure chamber 12. The spring 31 is of such value, and the lever 41 and the associated members are so proportioned, that movement of the floating carrier 43 does not affect the position of the piston 21.

For actuating the floating pivot carrier 43 there is provided a lever 55 which is mounted on a shaft 56, which is journaled in the main casing section 10, and which projects through the casing section wall and has a lever 58 secured thereon outwardly of the chamber 12. A spring 59 extends between the lever 58 and a projection 60 on the casing section 10 and normally urges the lever 56 to rotate in a clockwise direction.

The lever 55 engages the end of the floating pivot carrier 43, and engages a stop 62 secured to the main casing section 10, and which limits movement of the shaft 56 and lever 55 in a clockwise direction.

The fluid pressure responsive valve device 4 is constructed of a plurality of casing sections which have formed therein a piston chamber 70 which is in constant communication with the safety control pipe 71, and which has positioned therein a piston 72, which is mounted on a stem 73, slidably mounted in a bore in one of the casing sections, and which has secured on the other end thereof a valve 75 adapted to engage a seat rib 76. The piston 72 is subject on one side to the pressure of the fluid in the chamber 70 and is subject on the other side to the pressure of the spring 74.

The valve 75 has an arm 78 associated therewith which carries a valve 79 which is held away from the arm 78 by means of a spring 80 and which controls communication between a chamber 81 and the atmosphere by way of a chamber 82, open to the atmosphere, in which the valve 79 is positioned. The arm 78 is engageable with the stem of a valve 85 which is mounted in a chamber 86, and which is urged into engagement with a seat rib 87 by a spring 88. The chamber 86 is in constant communication with the reservoir 2 by way of the pipe and passage 90.

The casing of the fluid pressure responsive valve device 4 also has formed therein a bore in which is mounted a piston 96 which has formed integral therewith a stem 97, and which is engageable with a seat rib 98, the area inwardly of the seat rib 98 being in constant communication with the chamber 81, while the chamber 95 on the left hand side of the piston 96 and outwardly of the seat rib 98 is in constant communication with a passage 99.

The chamber 95A on the right hand side of the piston 96 is in constant communication with the atmosphere by way of the passage 100.

The stem 97 has secured on the other end thereof a piston 102, which is of somewhat smaller diameter than the piston 96, but of larger diameter than the seat rib 98. This piston is mounted in a bore forming a chamber 103 at the right hand side of the piston, which is in constant communication with the pressure chamber 12 in the self-lapping brake valve device 3 by way of the passage 104 and the pipe 106.

The chamber 103A at the left hand side of the piston 102 is in constant communication with the atmosphere by way of the passage 100.

The passage 99 is in constant communication with an automatic rail sanding device, indicated diagrammatically at 6 on the drawing, communication being by way of the passage 110, having a choke or restricted portion 111 interposed therein, and a pipe 112.

The fluid pressure responsive valve device 4 is provided with a chamber 115 which is in constant communication with the brake cylinder 1 by way of a pipe 117.

A double check valve 118 is mounted in a bore of the casing which opens at its opposite ends into the chamber 115 and said check valve is adapted to engage a seat rib 120 surrounding the passage 104, to control communication between passage 104 and the chamber 115, and a seat rib 121 surrounding the passage 99, to control communication between the passage 99 and the chamber 115.

The casing of the fluid pressure responsive valve device 4 has formed integral therewith a bracket 125 in which is journaled the end of the rod 56. The rod 56 has secured thereon a locking disk 127, while the casing of the fluid pressure valve device 4 has formed thereon adjacent the locking disk 127 a cam surface 128.

A lever 130 is pivotally secured on the casing of the fluid pressure responsive valve means 4 by means of a pin 131, and has an angular end portion 132 projecting through an opening in the piston chamber 70 so as to be engaged by the piston 72. The other end of the lever 130 has pivotally secured thereto, through a pin 134, an arm 135, which carries a roller 136 which is positioned between the locking disk 127 and the cam surface 128. The lever 130 is biased to move in a counterclockwise direction by means of the spring 140 and is urged in the opposite direction by the piston 72.

When the piston 72 is moved to the left as viewed in the drawing the spring 140 causes the lever 130 to rotate in a counterclockwise direction, and the arm 135 causes the roller 136 to move into engagement with the locking disk 127 and the cam surface 128, and thereby prevent rotation of the locking disk 127 and the shaft 56 in a clockwise direction, that is, in a direction to effect a release of the fluid in the brake cylinder through the self-lapping brake valve 3.

The manual brake control device 5 comprises a base member 140, a cover 141, and a pair of valve sections 142 and 143. The control device is adapted to be mounted upon the floor of the vehicle, and has a chamber 144 therein, in which is mounted a forked lever 145 having a hub portion 146, and a pair of spaced arms 147. This lever is pivotally mounted on a shaft 148 supported by the casing cover section 141. The arms 147 each have a recess 149 therein into which extends a spring 151 and which normally urges the left hand end of the arm upwardly as viewed in the drawing.

The lever 145 has a valve operating finger 154 formed integral therewith and adapted to engage the end of the stem of a valve 158.

A foot pedal 160 is provided and is formed integral with an arm 161 which is pivotally mounted on a pin 163 which extends between the arms 147, and which has pivotally secured on the end thereof, by means of a pin 165, a link 167, the other end of which is pivotally secured by means of the pin 169 to one arm of the bell crank 170 which is mounted on the casing section 141 by means of a pin 172. The other arm of the bell crank has connected thereto by means of a pin 174 a rod 180 which has its other end connected to the lever 58 by means of a pin 181.

The casing sections 142 and 143 cooperate to form a valve chamber 190 which is in constant communication with the safety control pipe 71, and which has mounted therein the valve 158, and a valve 191, which are separated by a washer 192, which is engaged by the spring 194 which operates through the washer 192 to urge the valve 158 to its seat.

The valve 158 controls communication between the chamber 190 and the atmosphere, while the valve 191 controls communication between the chamber 190 and the pipe 196 which communicates with the reservoir 2.

In operation, assuming that the foot pedal is maintained in the position in which it is shown in the drawing by pressure applied by the operator's foot, and that the heel portion of the foot pedal is depressed, as shown, the operating finger 154 is maintained out of engagement with the end of the valve 158, so that this valve is permitted to seat. At the same time fluid under pressure in the pipe 196 forces the valve 191 to the unseated position, so that fluid under pressure flows from the reservoir 2 by way of the pipes 90 and 196 to the valve chamber 190, and therefrom to the safety control pipe 71 which leads to the chamber 70 in the fluid pressure responsive valve means 4. The fluid under pressure in the chamber 70, acting on the piston 72, moves this piston to the extreme right hand position, and moves the lever 130 in a clockwise direction against the spring 140. This causes the roller 136 to be moved out of engagement with the cam surface 128, and thereby releases the locking disk 127 and the shaft 56. This permits the spring 59 to move the lever 58 and thereby rotate the shaft 56 in a clockwise direction so that the arm 55 is moved against the stop 62 and so that the floating pivot carrier 43 is permitted to move to the extreme right hand position thereby permitting the supply valve 16 to seat and permitting the release valve 25 to be unseated.

When the release valve 25 is unseated, the chamber 12, and the brake cylinder 1, which is in communication with the chamber 12 by way of the pipe 117, the chamber 115, passage 104 and pipe 106, are open to the atmosphere.

If it is desired to effect a service application of the brakes the foot pedal 160 is rotated by moving the toe portion of the foot pedal downwardly, thus causing the lever 161 to be turned in a clockwise direction about the pin 163 on which it is mounted and moving the link 167 downwardly. Movement of the link 167 is transmitted to the bell crank 170 so as to move the bell crank in a counterclockwise direction, and movement of the bell crank is transmitted through the rod 180 to the lever 58, thus causing the shaft 56 to be rotated in a counterclockwise direction.

When the shaft 56 is rotated in a counterclockwise direction the arm 55, which engages the end of the floating pivot carrier 43, moves the floating pivot carrier to the left, as viewed in the drawing, and on movement of this member the release valve 25 is first moved into engagement with its seat, so as to cut off communication from the chamber 12 to the atmosphere, and, on further movement of the floating pivot carrier 43, the pin 50 presses against the supply valve 16 causing it to move away from its seat, with the result that fluid under pressure flows from the reservoir 2 by way of the pipe 14 and the valve chamber 13 to the pressure chamber 12 and therefrom to the brake cylinder. Fluid flows from the pressure chamber 12 to the brake cylinder by way of the pipe 106, which communicates with the passage 104, and the flow of fluid to this passage causes the double check valve 118 to move into engagement with the seat rib 121, if it is not already in engagement with this seat rib. Fluid can then flow from the passage 104 to the chamber 115 and therefrom by way of the pipe 117 to the brake cylinder 1.

When the pressure of the fluid in the brake cylinder 1, and in the pressure chamber 12 builds up to a sufficient value, this value depending upon the position to which the floating pivot carrier 43 has been moved, the piston 21, which is subject on one side to the pressure in the pressure chamber 12, will be moved against the spring 31, and, on movement of the piston 21 to the left, the spring 17 acting through the supply valve 16 and the pin 50 will cause the lever 41 to pivot about the pin 42 until the supply valve 16 is moved into engagement with its seat, thereby cutting off the flow of fluid from the reservoir 2 to the pressure chamber 12 and to the brake cylinder. The further supply of fluid to the brake cylinder is then cut off.

If it is desired to increase the degree of application of the brakes the toe portion of the foot pedal 160 is moved downwardly a greater distance, and this causes the floating pivot carrier 43 to be moved to the left a greater distance, with the result that the pressure in the pressure chamber 12 must build up to a greater value before the piston 21 compresses the spring 31 an amount sufficient to permit the supply valve 16 to be moved to its seat.

If it is desired to decrease the degree of application of the brakes the toe portion of the foot pedal 160 is partially raised, and this permits the shaft 56 and the arm 55 to move in a clockwise direction being urged in this direction by the spring 59 acting through the arm 58, and, on movement of the arm 55 in this direction, the floating pivot carrier 43 will be released from the release valve 25 so as to permit this valve to be unseated by the spring 26, thereby permitting the release of fluid from the pressure chamber 12 to the atmosphere. Fluid will be released from the chamber 12 and from the brake cylinder until the pressure in the chamber 12 is reduced so that the spring 31 will move the piston 21 to the right until the seat on the piston is in engagement with the release valve 25. This will cut off the further release of fluid under pressure from the pressure chamber 12 and from the brake cylinder and the fluid pressure remaining in the brake cylinder will be held.

If, at a time when the brakes are released, the operator removes his foot from the pedal 160, either intentionally or otherwise, the arms 147 of the forked lever 145 in the manual brake control device 5, will be urged upwardly by the springs 151, and the valve operating finger 154 will engage the stem on the valve 158 and cause this valve to be moved away from its seat, and at the same time this valve will press against the valve 191 and move this valve to its seated position so as to cut off the flow of fluid from the reservoir to the valve chamber 190 by way of the pipes 99 and 196. When the valve 158 is unseated the fluid in the valve chamber 190, and in the safety control pipe 71, is permitted to escape to the atmosphere, thus reducing the pressure of the fluid in the chamber 70 in the fluid pressure responsive valve device 4.

When the pressure of the fluid in the chamber 70 is reduced the piston 72 is moved to the left, as viewed in the drawing, by the spring 74, and on movement of the piston the stem 73 and the valve 75 are also moved until the valve 75 seats on the seat rib 76 so as to cut off communication between the chamber 81 and the atmosphere around the stem 73. When the valve 75 is moved to the left as viewed in the drawing, the valve 79 will be moved to its seat, and will be held in the seated position by force transmitted from the arm 78 through the spring 80, and on further movement of the valve 75 the end of the arm 78 will engage the end of the stem on the valve 85 and move this valve away from the seat rib 87 against the pressure of the spring 88. When the valve 85 is unseated fluid under pressure is permitted to flow from the reservoir 2 by way of the pipe and passage 90 to the chamber 86, and therefrom to the chamber 81.

The pressure of the fluid in the chamber 81 operating on the area of the piston 96 within the seat rib 98 is great enough, when the pressure of the fluid in the chamber 103 is at atmospheric pressure, or is below a low predetermined pressure to move the piston 96 to the right, as viewed in the drawing, away from the seat rib 98 and thereby permit fluid to flow from the chamber 81 to the chamber 95 on the left hand side of the piston 96, from which it flows to the passage 99.

When fluid under pressure is supplied to the passage 99 the double check valve 118 is forced away from the seat rib 121 and into engagement with the seat rib 120. This permits fluid to flow from the passage 99 to the chamber 115, and therefrom by way of the pipe 117 to the brake cylinder 1. At this time the flow of fluid from the chamber 115 to the passage 104, and therefrom by way of the pipe 106 to the pressure chamber 12 in the self-lapping brake valve device 3, from which it could escape to the atmosphere through the open release valve 25, is cut off by the double check valve 118 which is in engagement with the seat rib 120.

Fluid under pressure also flows from the passage 99 to the automatic rail sanding device 6 by way of the choke 111 and the passage 110 which communicates with the automatic sanding device 6 by way of the pipe 112. On an emergency application of the brakes, therefore, the automatic sanding device operates automatically to supply sand to the rails in order to assist in stopping the vehicle.

It will be seen that when fluid is supplied to the brake cylinder as a result of the reduction in the pressure of the fluid in the safety control pipe it is supplied through a passage which is independent of the self-lapping brake valve 3, with the result that the rate of flow is not limited by the capacity of the passages in the self-lapping brake valve.

In addition, it will be seen that as fluid is supplied to the brake cylinder independently of the self-lapping brake valve on the release of fluid from the safety control pipe, the supply of fluid to the brake cylinder is not dependent in any way on the proper operation of the self-lapping brake valve. It is possible, therefore, to secure an application of the brakes by releasing the fluid in the safety control pipe even though the self-lapping valve device should be rendered inoperative.

In order to release the brakes after an emergency application effected by the release of fluid from the safety control pipe the operator again applies pressure to the heel portion of the pedal 160 so as to force the arms 147 downwardly against the springs 151 and thereby move the valve operating finger 154 out of engagement with the end of the valve 158. The valve 158 is then moved to its seat by the spring 194 so as to cut off communication between the safety control pipe 71 and the atmosphere, and at the same time the valve 191 is moved to the unseated position by the pressure of the fluid in the pipe 196, and fluid thereupon flows from the reservoir 2 by way of the pipes 99 and 196 to the valve chamber 190, and therefrom to the safety control pipe 71 and to the chamber 70.

When the pressure of the fluid in the chamber 70 builds up to a sufficient value the piston 72 will be forced to the right, as viewed in the drawing, against the spring 74 and against the pressure of the fluid in the chamber 81 acting on the valve element 75, and on movement of the piston 72, the stem 73 and the valve 75 will also be moved, with the result that the arm 78 will be moved out of engagement with the stem on the valve 85 thereby permitting this valve to seat, while the valve 79 will be unseated with the result that fluid under pressure will be permitted to escape from the chamber 81 to the atmosphere by way of the passage 82. The supply of fluid under pressure to the chamber 81 from the pipe 90 which communicates with the reservoir 2 will be cut off when the valve 85 is moved to its seat by the spring 88.

When fluid is released from the chamber 81 it is also released from the brake cylinder 1 through the pipe 117, the chamber 115, past the double check valve 118 to the passage 99, and therefrom to the chamber 95 on the left hand side of the piston 96, and past the seat rib 98 to the chamber 81, thereby effecting a release of the brakes.

On a service application of the brakes following the release of the brakes after an emergency application, fluid under pressure is supplied from the pressure chamber 12 by way of the pipe 106 to the passage 104, and the pressure of the fluid in this passage forces the double check valve 118 out of engagement with the seat rib 120 and into engagement with the seat rib 121, thus cutting off communication between the chamber 115 and the passage 99 which is in communication with the atmosphere. At the same time fluid under pressure flows from the passage 104 to the chamber 103, and the pressure of the fluid in this chamber operating on the piston 102 moves this piston to the left, as viewed in the drawing, and movement of this piston is transmitted through the stem 97 to the piston 96 and forces this piston into engagement with the seat rib 98.

The braking system provided by this invention also provides means by which the operator after effecting a service application of the brakes to a predetermined degree may remove his foot from the foot pedal of the manual brake control device without producing an emergency application of the brakes. The equipment then operates to prevent a release of the brakes until the operator returns his foot to the foot pedal of the manual brake control device and operates this device to restore the pressure of the fluid in the safety control pipe, but at all times permits the degree of application of the brakes to be increased.

This permits the operator to apply the brakes with sufficient force to hold the car on a track, and then leave the car without causing an emergency application of the brakes.

In order to accomplish this result the operator first effects a service application of the brakes by pressing on the toe portion of the foot pedal 160, thereby causing the arm 161 to pivot on the pin 163 and moving the bell crank 170 in a counterclockwise direction which produces similar movement of the shaft 56. This shaft moves the floating pivot carrier 43 to a position to cause the release valve 25 to move to the seated position, while causing the supply valve 16 to move to the unseated position and permit fluid to flow from the reservoir 2 to the pressure chamber 12 and therefrom to the brake cylinder.

The fluid in the pressure chamber 12 flows from this chamber through the pipe 106 to the passage 104 and presses the double check valve 118 against the seat rib 121 to cut off the flow of fluid from the chamber 115 to the passage 99. Fluid also flows from the passage 104 to the chamber 103 where the fluid which operates on the piston 102 forces the piston to the left, as viewed in the drawing, and the force exerted on this piston is transmitted through the stem 97 to the piston 96 and presses this piston against the seat rib 98. As will be seen in the drawing the piston 102 is substantially larger in diameter than the area within the seat rib 98.

When the pressure of the fluid in the brake cylinder has built up to a value sufficient to produce a predetermined application of the brakes sufficient to maintain the vehicle against movement the operator lifts his heel from the pedal 160 of the manual brake control device 5 while maintaining pressure on the toe portion of the pedal, thus permitting the foot pedal 160 and the arm 161 to pivot about the pin 165, while maintaining the bell crank 170 and the shaft 56 in substantially the position to which they have been moved. When the pedal 160 pivots about the pin 165 the arms 147 are raised upwardly by the springs 151, and the valve operating finger 154 engages the end of the valve 158 so as to unseat this valve and to move the valve 191 to its seat. This causes the supply of fluid under pressure to the safety control pipe to be cut off, and releases the fluid in the safety control pipe to be vented to the atmosphere.

When fluid in the safety control pipe 71 is vented to the atmosphere, fluid from the chamber 70 is also vented and the piston 72 is moved to the left, as viewed in the drawing, by the spring 74. When the piston 72 moves the stem 73 moves also and the valve 75 is moved into engagement with the seat rib 76, while the arm 78 moves the valve 79 into engagement with its seat, and also engages the stem on the valve 85 so as to move this valve away from the seat rib 87.

When the valve 85 is unseated fluid under pressure flows from the reservoir 2 by way of the pipe 90 to the chamber 86 and therefrom to the chamber 81. The pressure of the fluid in this chamber operates on the portion of the piston 96 within the seat rib 98, but because of the relatively small area of this portion as compared to the relatively large area of the piston 102 the force exerted by the fluid operating on the piston 96 is insufficient to move this piston out of engagement with the seat rib 98. Movement of the piston 96 away from the seat rib 98 is opposed by the pressure of the fluid in the chamber 103 acting on the piston 102, which force is transmitted to the piston 96 through the stem 97, and because the piston 102 is of substantially larger diameter than the area within the seat rib 98, the force exerted on the piston 102 exceeds that exerted on the piston 96 by the fluid within the seat rib 98, providing the pressure of the fluid in the chamber 103 exceeds a predetermined value. Fluid, therefore, will not be supplied to the brake cylinder as a result of venting fluid from the safety control pipe.

When the piston 72 moves to the left out of engagement with the end 132 of the lever 130 the spring 140 causes this lever to rotate in a counterclockwise direction on the pin 131, and as a result the roller 136 is moved into engagement with the locking disk 127 and the cam surface 128, so as to lock the locking disk 127 against rotation in a clockwise direction by the spring 59 or otherwise, that is, in a direction to move the self-lapping brake valve to the release position. The roller 136, however, does not interfere with rotation of the locking disk 127, and therefore of the shaft 56 which controls the self-lapping brake valve, in a counterclockwise direction, that is, in a direction to increase the degree of application of the brakes.

In order to effect a release of the brakes it is necessary to restore the pressure of the fluid in the chamber 70 and thereby cause the piston 72 to be moved against the spring 74, and to engage the end 132 of the lever 130 to move the roller 136 out of engagement with the locking disk 127 and the cam surface 128. This will again permit the shaft 56 to be rotated in a clockwise direction so as to condition the self-lapping brake valve device to release fluid from the brake cylinder. The pressure of the fluid in the safety control pipe 71 and the chamber 70 will be restored when the operator again presses downwardly on the heel portion of the pedal 160 of the manual brake control device so as to cause the arms 147 to move downwardly and thus move the valve operating finger 154 out of engagement with the valve 158.

While one form of the brake control apparatus provided by this invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a fluid pressure brake, in combination, a brake valve device operable to supply fluid under pressure to a brake cylinder to effect an application of the brakes, manually operated means for operating said brake valve device, fluid pressure responsive means for supplying fluid under pressure to the brake cylinder, and means subject to and operated by the fluid under pressure supplied to the brake cylinder by the brake valve device on a partial application of the brakes for cutting off the communication through which the last named means supplies fluid to the brake cylinder.

2. In a fluid pressure brake, in combination, a brake valve device operable to supply fluid under pressure to a brake cylinder to effect an application of the brakes, manually operated means for operating said brake valve device, fluid pressure responsive means for supplying fluid under pressure to the brake cylinder independently of the brake valve device, and means subject to and operated by the fluid under pressure supplied to the brake cylinder by the brake valve device on partial application of the brakes for cutting off the communication through which the last named means supplies fluid to the brake cylinder.

3. In a fluid pressure brake, in combination, a brake cylinder, a brake valve device operative to supply fluid under pressure to the brake cylinder at a limited rate for effecting service applications of the brakes, a safety control pipe, means operative on the release of manually applied pressure to cut off the supply of fluid under pressure to the safety control pipe and to release fluid therefrom, and valve means operative upon a reduction in fluid pressure in said pipe for supplying fluid under pressure to the brake cylinder at a faster rate than said brake valve device.

4. In a fluid pressure brake, in combination, a brake valve device operable to supply fluid under pressure to a brake cylinder to effect an application of the brakes, a safety control pipe, means responsive to the pressure of fluid in the safety control pipe and controlling the supply of fluid to the brake cylinder, manually operated means comprising an oscillatable member movable between a release position and an application position for operating the brake valve device, means yieldingly urging said member to the release position, a cam surface adjacent the oscillatable member, a locking member positioned between the oscillatable member and the cam surface and controlled by means responsive to the pressure of the fluid in the safety control pipe, the locking member being moved into engagement with the oscillatable member and with the cam surface on a reduction in the pressure in the control pipe to prevent movement of said oscillatable member toward the release position.

5. In a fluid pressure brake, a brake cylinder, a safety control pipe normally charged with fluid under pressure, a manually operated valve device for supplying fluid under pressure to and for releasing fluid under pressure from said brake cylinder, valve means operative on a reduction in the pressure of the fluid in the safety control pipe to supply fluid under pressure to the brake cylinder through a passage independent of the said valve device, means subject to the pressure of the fluid supplied to the brake cylinder by the said valve device and operative on an increase in said pressure to a predetermined value present on a partial application of the brakes to cut off the communication through which fluid under pressure is supplied to the brake cylinder by operation of the said valve means.

6. In a fluid pressure brake, a brake cylinder, a safety control pipe normally charged with fluid under pressure, a brake valve device operative to supply fluid under pressure to the brake cylinder at a rate limited to that desired in effecting service applications of the brakes, valve means operative on a reduction in the pressure of the fluid in the safety control pipe to supply fluid under pressure to the brake cylinder independently of the brake valve device at a faster rate than said brake valve device, and means subject to the pressure of the fluid supplied to the brake cylinder by the said valve device and operative on an increase in said pressure to a predetermined value present on a partial application of the brakes to cut off the communication through which fluid under pressure is supplied to the brake cylinder by operation of the said valve means.

7. In a fluid pressure brake, in combination, a brake cylinder, a brake valve device operative to supply fluid under pressure to and release fluid under pressure from the brake cylinder, a member movable between a release position and an application position for controlling said brake valve device, means yieldingly urging said member to the release position, a safety control pipe, valve means operative upon a reduction in safety control pipe pressure for also supplying fluid under pressure to the brake cylinder, and means subject to and operated on a reduction in safety control pipe pressure to prevent release movement of the said movable member.

8. In a fluid pressure brake, in combination, a brake cylinder, a brake valve device operative to supply fluid under pressure to and release fluid under pressure from the brake cylinder, a member movable between a release position and an application position for controlling said brake valve device, means yieldingly urging said member to the release position, a safety control pipe, valve means operative on a reduction in safety control pipe pressure to supply fluid under pressure to the brake cylinder independently of the brake valve device, and means subject to and operated on a reduction in safety control pipe pressure to prevent release movement of the said movable member.

9. In a fluid pressure brake, in combination, a brake cylinder, a brake valve device operative to supply fluid under pressure to and release fluid under pressure from the brake cylinder, a member movable between a release position and an application position for controlling said brake valve device, means yieldingly urging said member to the release position, a safety control pipe, valve means operative on a reduction in safety control pipe pressure to supply fluid under pressure to the brake cylinder independently of the brake valve device, means subject to the pressure of the fluid supplied to the brake cylinder by said brake valve device and operative on an increase in said pressure to a predetermined value present on a partial application of the brakes to cut off the communication through which fluid under pressure is supplied to the brake cylinder by operation of the said valve means, and means subject to and operated on a reduction in safety control pipe pressure to prevent release movement of the said movable member.

10. In a fluid pressure brake equipment, in combination, a brake cylinder, a self-lapping brake valve, a member movable from a release position through an application zone to condition the brake valve to supply fluid under pressure to a passage through which fluid may be supplied to the brake cylinder, the brake valve being adapted to supply fluid to the brake cylinder at pressures which vary in accordance with the extent of movement of the movable member away from the release position, means yieldingly urging said movable member to the release position, a safety control pipe, means operative on the release of manually applied pressure for cutting off the supply of fluid under pressure to said safety control pipe and for releasing fluid therefrom, and means subject to and operated on a reduction in the pressure of the fluid in the safety control pipe for preventing movement of said movable member towards the release position.

11. In a fluid pressure brake equipment, in combination, a brake cylinder, a self-lapping brake valve, a member movable from a release position through an application zone to condition the brake valve to supply fluid under pressure to a passage through which fluid may be supplied to the brake cylinder, the brake valve being adapted to supply fluid to the brake cylinder at pressures which vary in accordance with the extent of movement of the movable member away from the release position, means yieldingly urging said movable member to the release position, a safety control pipe, means operative on the release of manually applied pressure for cutting off the supply of fluid under pressure to said safety control pipe and for releasing fluid therefrom, means subject to and operated on a reduction in the pressure of the fluid in the safety control pipe for preventing movement of said movable member towards the release position, and valve means subject to and operated on a reduction in the pressure of the fluid in the safety control pipe for also supplying fluid to the brake cylinder.

12. In a fluid pressure brake equipment, in combination, a brake cylinder, a self-lapping brake valve, a member movable from a release position through an application zone to condition the brake valve to supply fluid under pressure to a passage through which fluid may be supplied to the brake cylinder, the brake valve being adapted to supply fluid to the brake cylinder at pressures which vary in accordance with the extent of movement of the movable member away from the release position, means yieldingly urging said movable member to the release position, a safety control pipe, means operative on the release of manually applied pressure for cutting off the supply of fluid under pressure to said safety control pipe and for releasing fluid therefrom, means subject to and operated on a reduction in the pressure of the fluid in the safety control pipe for preventing movement of said movable member towards the release position, valve means subject to and operated on a reduction in the pressure of the fluid in the safety control pipe for also supplying fluid to the brake cylinder, and means subject to the pressure of the fluid supplied by the brake valve and operative on an increase in said pressure to a predetermined value present on a partial application of the brakes to prevent the supply of fluid under pressure to the brake cylinder by operation of said valve means.

RANKIN J. BUSH.